United States Patent [19]

Imaizumi et al.

[11] Patent Number: 4,860,002

[45] Date of Patent: Aug. 22, 1989

[54] LOCK SYSTEM FOR OPENING COVER MEMBER OF VEHICLE

[75] Inventors: Tomoaki Imaizumi, Aichi; Taneichi Kawai; Kouji Nishida, both of Anjo; Yuuichi Murakami, Tokyo, all of Japan

[73] Assignee: Aisin Seiki Kabushiki Kaisha, Kariya, Japan

[21] Appl. No.: 281,601

[22] Filed: Dec. 8, 1988

Related U.S. Application Data

[63] Continuation of Ser. No. 27,476, Mar. 18, 1987, abandoned.

[30] Foreign Application Priority Data

Mar. 18, 1986 [JP] Japan ..................... 61-60068
Mar. 18, 1986 [JP] Japan ..................... 61-60069

[51] Int. Cl.[4] ..................... G06F 7/04

[52] U.S. Cl. ..................... 340/825.310; 340/825.690; 307/10.2

[58] Field of Search ..................... 340/825.31, 825.69, 340/825.72, 63, 64; 361/172

[56] References Cited

U.S. PATENT DOCUMENTS

| | | | |
|---|---|---|---|
| 4,104,694 | 8/1978 | Hargrove | 340/825.31 |
| 4,486,806 | 12/1984 | Mochida et al. | 361/172 |
| 4,488,056 | 12/1984 | Mochida | 340/825.31 |
| 4,672,375 | 6/1987 | Mochida et al. | 340/825.31 |
| 4,688,036 | 8/1987 | Hirano et al. | 340/825.31 |
| 4,700,186 | 10/1987 | Fujino et al. | 340/825.72 |

*Primary Examiner*—Donald J. Yusko
*Assistant Examiner*—Edwin C. Holloway, III
*Attorney, Agent, or Firm*—Sughrue, Mion, Zinn, Macpeak & Seas

[57] ABSTRACT

There is disclosed a power door lock system for use with an automobile, The lock system comprises an actuator for locking or unlocking a door or the tailgate, a microcomputer, a key code transmitter mounted on the vehicle, a key code receiver connected with the microcomputer, a nonvolatile memory in which a key code is stored, timers connected with the microcomputer, a passenger-detecting circuit, and a switch that is closed when the door is completely closed. The microcomputer includes a comparator for comparing the key code detected by the key code receiver with the key code stored in the memory. The operation of the actuator is controlled by the microcomputer to prevent malfunction.

22 Claims, 10 Drawing Sheets

FIG. 2b
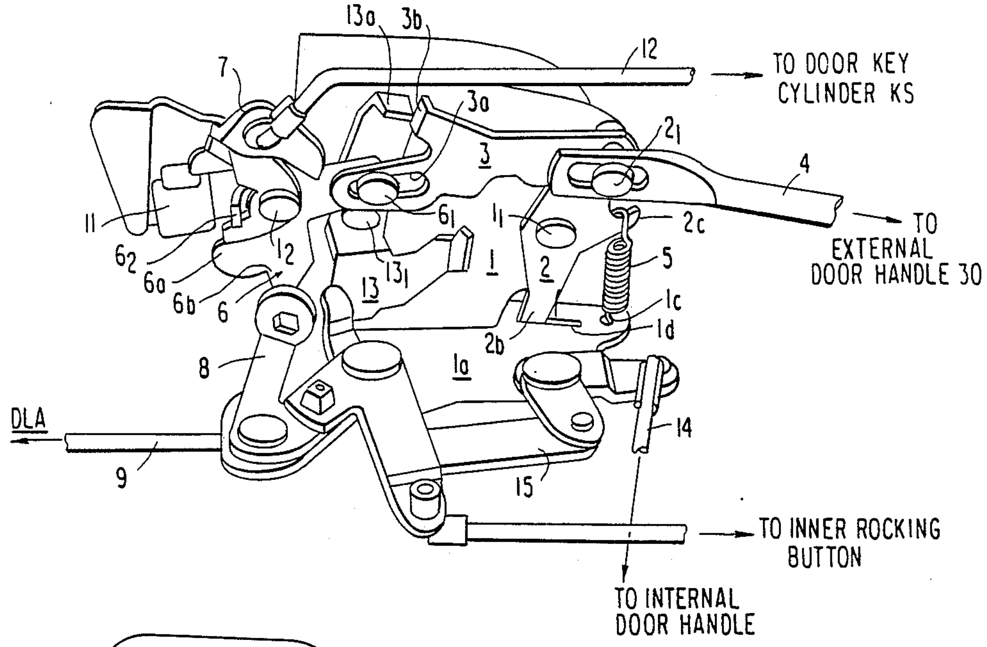
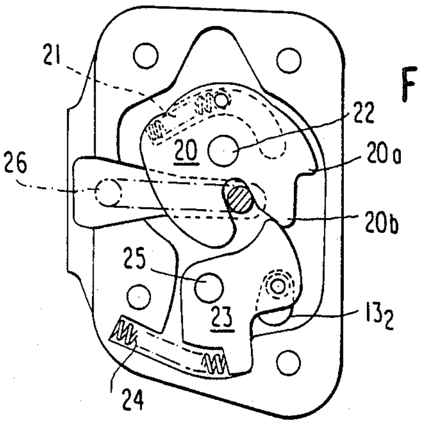
FIG. 2c
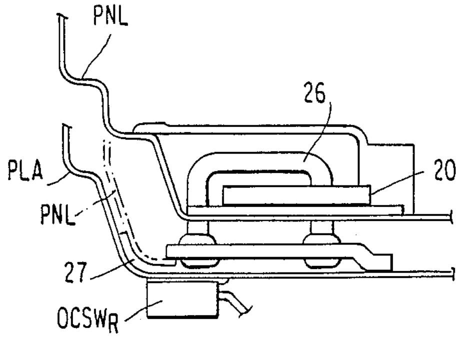
FIG. 2d

LOCK SYSTEM FOR OPENING COVER MEMBER OF VEHICLE

This is a continuation of application Ser. No. 07/027,476 filed on Mar. 18, 1987 now abandoned.

FIELD OF THE INVENTION

The present invention relates to a lock system for a member that covers a vehicular opening, such as a door or tailgate and, more particularly, to a lock system which is remotely controlled without malfunctioning.

BACKGROUND OF THE INVENTION

Referring to FIG. 2*a*, there is shown a conventional, remotely controlled lock system for use with an automotive door lock mechanism. This system permits the driver to either lock or unlock the associated door by operating a portable transmitter (not shown) without the need to operate the mechanical door key cylinder KS of the door lock mechanism. More specifically, the door lock mechanism is further equipped with locking and unlocking solenoids. The transmitter held by the driver transmits electromagnetic waves including information on a certain key code. The waves are received by the transmitter installed on the vehicle, and the key code is detected and compared with a code previously stored in a memory. If they coincide, then the locking or unlocking solenoid is energized to actuate the door lock mechanism, for locking or unlocking the door. Thus, when the driver or other person gets in the vehicle, he or she operates the transmitter to transmit a signal for unlocking the door. When he or she gets out of the vehicle, the operator operates the transmitter to send out a signal for locking the door. In this way, the door can be locked and unlocked without the need of mechanical operation.

A vehicular door lock mechanism of this kind has a second latch position to secure safety during movement of the vehicle. When the door is in this second latch position, it is incompletely closed. Pushing the door beyond the latch position will bring the door into a primary latch position, where the door is completely closed. However, when the door is in the second latch position and the door is locked, pushing the door beyond the second latch position will unlock the door. Door lock systems of this type often receive instructions for locking the door from relatively remote locations. Therefore, there is the possibility that the driver locks the door without knowing that it is incompletely closed and then another person pushes the door beyond the second latch position to thereby unlock the door, creating the danger of theft of the vehicle.

The conventional door lock system has another problem. Specifically, if the driver erroneously operates the transmitter and leaves the vehicle without noticing that the door has been unlocked, then the door is left unlocked, creating the danger of theft of the vehicle.

SUMMARY OF THE INVENTION

It is an object of the present invention to provide a vehicular opening cover member lock system which prevents the cover member from being unlocked when the cover member is pushed beyond the second latch position after it is placed in this second latch position, i.e., the cover member is incompletely closed.

It is another object of the invention to provide a vehicular opening cover member lock system which prevents the opening cover member from being unlocked when a signal containing information on a key code is produced by a driver's erroneous operation.

The first-mentioned object is achieved by a lock system for a vehicular opening cover member, said system comprising: a lock mechanism which, when instructed to lock the opening cover member, actuates a driver means to lock the cover member; and a detector means for detecting the full closure of the cover member. When the full closure of the cover member is not detected by the detector means, if the lock mechanism is instructed to lock the cover member, then it actuates the driver means. Then, if the full closure of the cover member is detected, the drive means is again actuated.

When the driver locks the opening cover member such as a door without noticing that it is in its second latch position, if another person pushes the door beyond the second latch position, unlocking the door, then the full closure of the door is immediately detected. This actuates the drive means again to lock the door. Hence, it is unlikely that another person unlocks the door. If the driver notices that the door is in its second latch position after the operation for locking the door is performed, then he or she can completely lock the door simply by pushing the door without actuating the door lock mechanism again.

The second-mentioned object is achieved by a vehicular opening cover member lock system comprising: a lock mechanism capable of locking and unlocking a vehicular opening cover member; a detector means for detecting operation of a handle that opens the cover member; a timer means; a key code-generating means for producing information on a key code; and a memory in which a key code has been previously stored. When the key code produced by the key code-generating means coincides with the key code stored in the memory, the timing means is started. The lock mechanism is caused to unlock the cover member only when the detector means detects the operation of the handle before the timing means produces a timeout signal.

Even when a signal containing a key code is produced by a driver's erroneous operation, the lock mechanism is not caused to unlock the cover member unless the handle for opening the cover member is operated within a certain period. Therefore, such an undesirable situation that the lock mechanism keeps unlocking the cover member does not take place. Whenever the driver consciously performs an operation to produce the aforementioned signal, the handle is operated. In this case, therefore, the cover member is unlocked in a conventional manner.

Other objects and features of the invention will appear in the course of the description thereof which follows.

Figure 1:
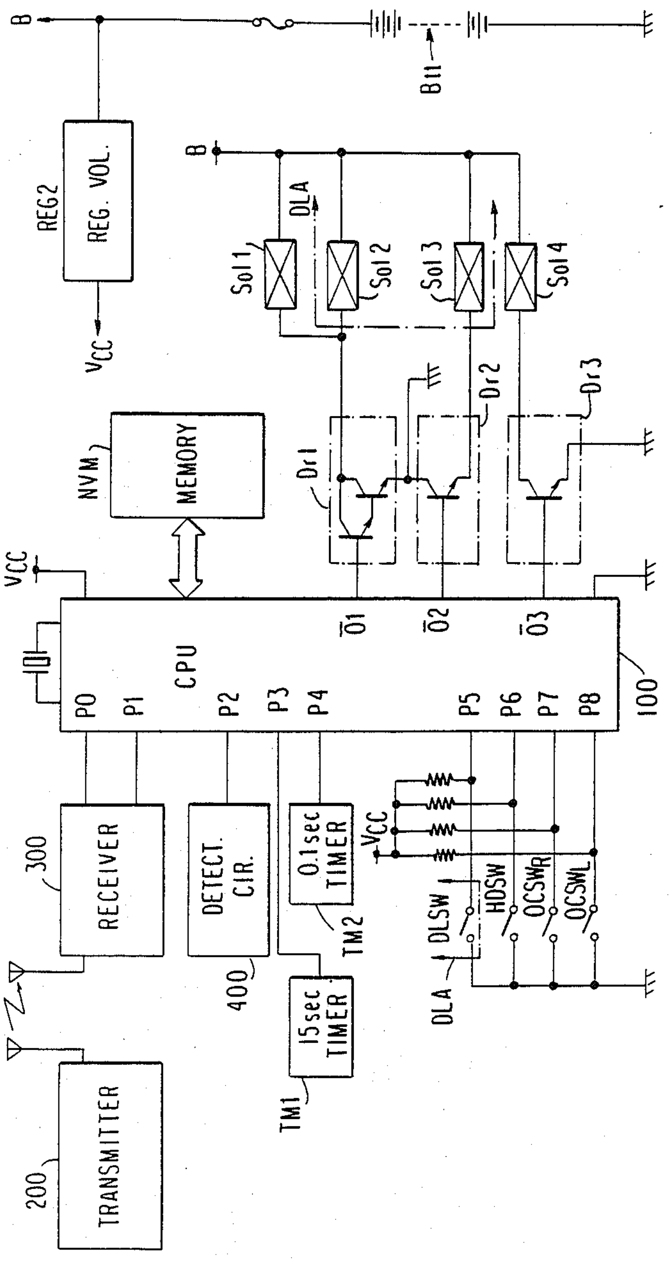
FIG. 1 is a block diagram of the control system of a lock system according to the invention.
Figure 3:
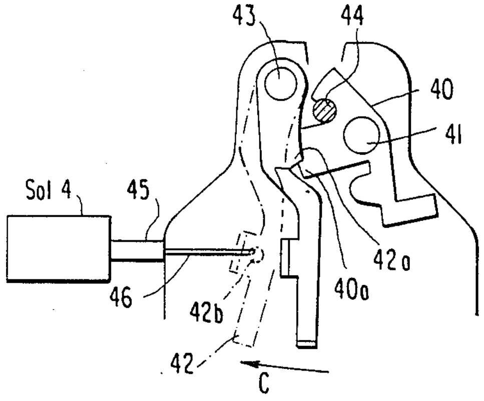
Figure 5:
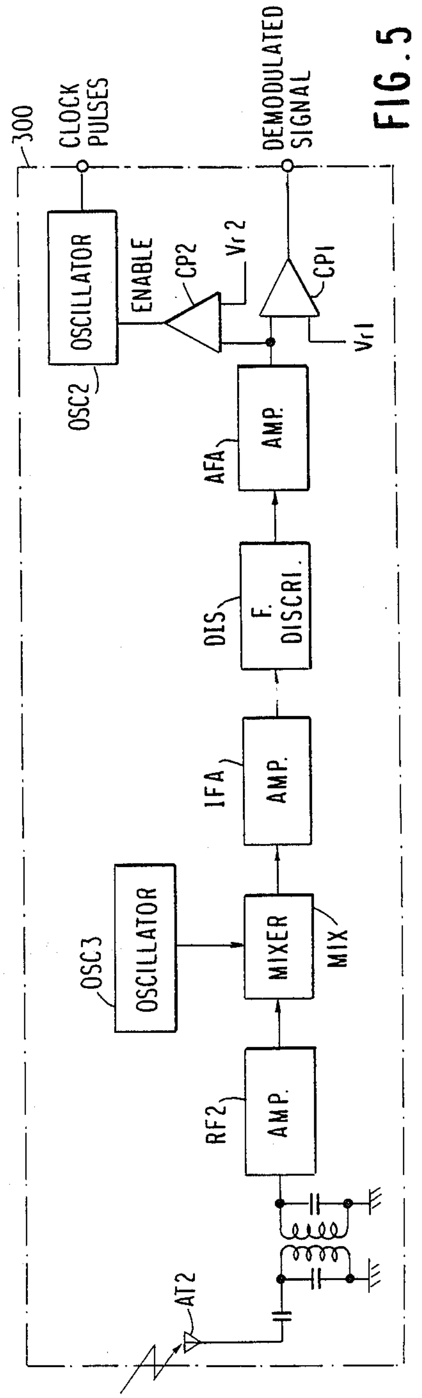
Figure 6B:
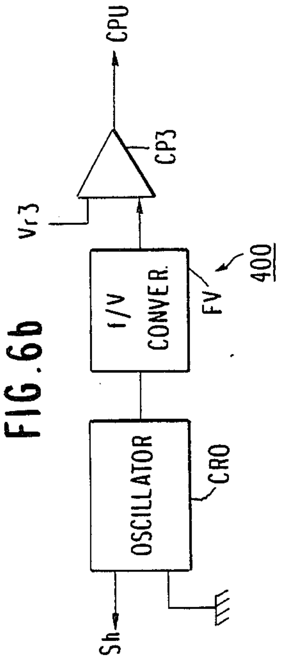
Figure 6A:
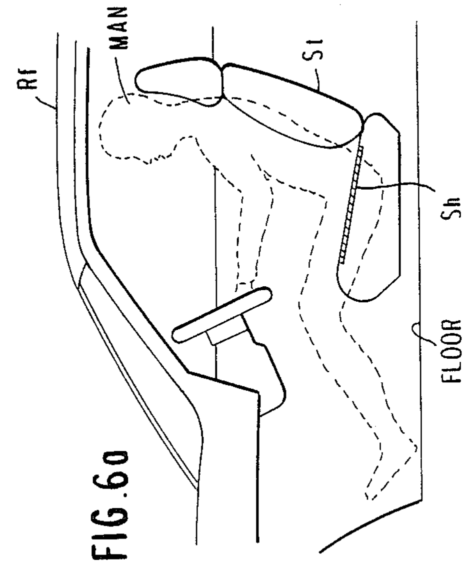

FIG. $2e$ is a plan view of an external door handle 300 and its surroundings at the side of the driver's door of a vehicle;

FIG. 3 is a front elevation of a tailgate latch mechanism mounted on a vehicle;

FIG. $4a$ is a block diagram of the key code transmitter 200 shown in FIG. 1;

FIG. $4b$ is a timing chart of the waves produced in various locations in the key code transmitter 200 shown in FIG. $4a$, for illustrating the operation of the transmitter;

FIG. 5 is a block diagram of the key code receiver 300 shown in FIG. 1;

FIG. $6a$ is a side elevation of the front portion of an automobile, for illustrating the operation of the passenger-detecting circuit 400 shown in FIG. 1;

FIG. $6b$ is a block diagram of the passenger-detecting circuit 400 shown in FIG. 1;

FIGS. $7a$ and $7b$ are flowcharts for illustrating the main routines of the computer program stored in the microcomputer 100 shown in FIG. 1;

FIGS. $8a$ and $8b$ are flowcharts for illustrating the subroutines of the computer program stored in the microcomputer 100 shown in FIG. 1.

DETAILED DESCRIPTION OF THE INVENTION

Referring to FIGS. $2a$ and $2b$, there are shown main portions of an internal door lock mechanism mounted at the side of the driver's door of an automobile. This mechanism has a pin $1_1$ rigidly fixed to the right side of a base plate 1. A return lever 2 having three arms $2a$, $2b$, $2c$ is pivotally mounted to the pin $1_1$. Another pin $2_1$ is securely fixed to the first arm $2a$ which extends upwardly as viewed in these figures. A rod 4 connected to a connector lever 3 and to an outer handle 30 engages with the pin $2_1$. The second arm $2b$ extending downwardly as viewed in the figures extends through a hole $1d$ formed in the horizontal wall portion $1a$ of the base plate 1 which is bent at right angles to the body of the base plate 1. The angle through which the return lever 2 can rotate is limited by the size of this hole $1d$. One end of a tension spring 5 is attached to the spring-loaded third arm $2c$ that extends to the right. The other end of the spring 5 is engaged in a hole $1c$ formed in the horizontal wall portion $1a$ of the base plate 1. Thus, the return lever 2 is always urged to rotate clockwise about the pin $1_1$.

Rigidly fixed to the left side of the base plate 1 is a pin $1_2$ to which a first rocking plate 6 and a second rocking plate 7 are pivotally mounted. The first rocking plate 6 has four arms $6a$, $6b$, $6c$, and $6d$. A pin $6_1$ is firmly secured to the first arm $6a$ which extends to the right. This pin $6_1$ engaged in a slot $3a$ formed in the aforementioned connector lever 3. The second arm $6b$ extending downwardly has an end portion which is bent vertically away from the page and engages with a link mechanism 8. A door lock actuator DLA has a plunger 16 that is connected to a rod 9. Another rod 10 is connected to an inner rocking switch (not shown). The rods 9 and 10 are coupled to the link mechanism 8. Therefore, the second arm $6b$ is connected with the plunger 16 of the actuator DLA and with the inner rocking switch (not shown) via the link mechanism 8. Angular movement of the first rocking plate 6 about the pin $1_2$ is limited by the abutting engagement of either the third arm $6c$ extending to the left or the fourth arm $6d$ extending downward to the left with a stopper 11 firmly fixed to the base plate 1. The first rocking plate 6 has a protrusion $6_2$ near the pin $1_2$ to which the plate is pivotally mounted. The second rocking plate 7 has an upwardly extending arm $7a$ with which a rod 12 connected to a mechanical door key cylinder KS engages. A recess is formed between a first push arm $7b$ and a second push arm $7c$ near the pin $1_2$ about which the second rocking plate 7 rotates. When the door is unlocked, i.e., under the condition shown in FIGS. $2a$ and $2b$, the first push arm $7b$ bears on the protrusion $6_2$ of the first rocking plate 6. When the door is locked as described later, the second push arm $7c$ bears on the protrusion $6_2$.

An unlatch lever 13 to which a pin $13_1$ is rigidly affixed is pivotally mounted to substantially the center of the base plate 1. The pin $13_1$ extends outwardly through the base plate . An external door lock mechanism shown in FIG. $2c$ has a detent lever 23 which is rotated by a cam $13_2$ rigidly fixed to the outer end of the pin $13_1$. The upper end portion of the unlatch lever 13 is bent vertically away from the page to form a claw $13a$. Under the unlocked condition shown in FIGS. $2a$ and $2b$, the push arm $3b$ of the connector lever 3 bears on the claw $13a$. A rod 14 connected with an internal door handle (not shown) engages with a link mechanism 15 that acts on the lower end of the unlatch lever 13.

The door lock actuator DLA is a bidirectional solenoid-operated actuator. The plunger 16 of the actuator DLA takes up a first posture shown in FIGS. $2a$ and $2b$ and a second posture in which the plunger has been pulled inward from the first posture as indicated by the arrow A. The actuator DLA includes a door lock switch DLSW (see FIG. 1) which, when the plunger 16 assumes the second posture, is closed.

Referring next to FIGS. $2c$ and $2d$, the external door lock mechanism consists mainly of a disklike fork bolt 20, the aforementioned detent lever 23, and an annular striker 26. The bolt 20 having a primary latch $20b$ and a second latch $20a$ further includes a rotating shaft 22 which is pivotally mounted to the body of the door, or the door panel, indicated by PNL, or a part rigidly fixed to it. A compressed coiled spring 21 always urges the belt 20 to rotate clockwise. The detent lever 23 has a rotating shaft 25 which is pivotally mounted to the body of the door. Another compressed coiled spring 24 urges the lever 23 to turn counterclockwise at all times. The striker 26 is rigidly mounted to a pillar PLA. A normally closed Curtis switch $OCSW_R$ is mounted on the driver's seat and on the pillar PLA below the striker 26. Only the knob, indicated by numeral 27, of the switch $OCSW_R$ is mounted outside, i.e., at the side of the striker 26.

The door is completely closed when the fork bolt 20 engages the hatched portion (FIG. $2c$) of the striker 26 and the claw of the detent lever 23 bears on the primary latch $20b$ of the bolt 20. Under this condition, the portion of the door panel PNL which is indicated by the phantom line in FIG. $2d$, located below the door lock mechanism, and extends toward the pillar PLA bears on the knob 27 of the switch $OCSW_R$, and shifts the knob to the left, opening the switch $OCSW_R$.

When the fork bolt 20 rotates clockwise from the position shown in FIG. $2c$ and the claw of the detent lever 23 bears on the second latch $20a$ of the bolt 20, the door is incompletely closed, but the door is prevented from opening, because the bolt 20 still engages the striker 26. The second latch $20a$ is provided to secure safety while the vehicle is being driven. At this time, the aforementioned extending portion of the door panel PNL is not in contact with the knob 27 of the switch $OCSW_R$ and so the spring (not shown) mounted in the knob 27 pushes back the knob 27 to the right as viewed in FIG. 2*d*, closing the switch $OCSW_R$.

Figure 2A:
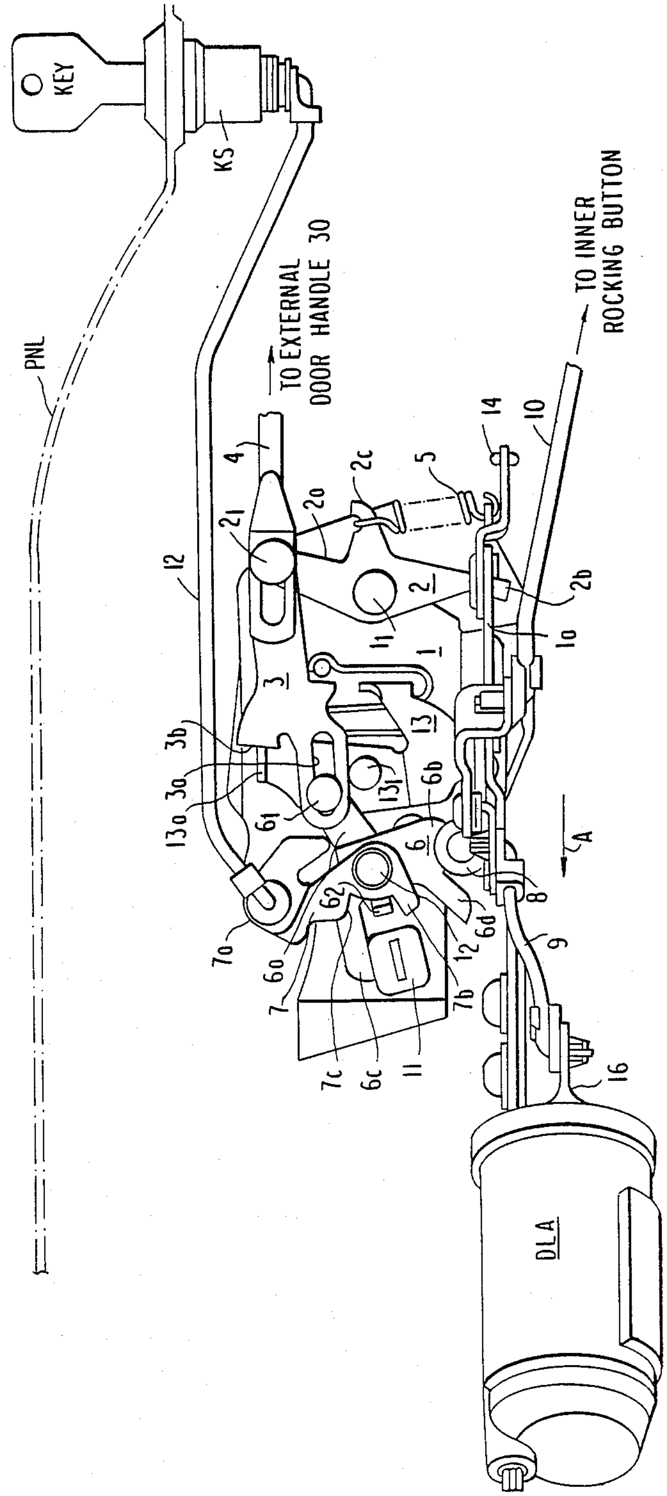
FIG. 2a PRIOR ART
FIG. 2*a* is a front elevation of an inner door lock mechanism at the side of the driver's door of a vehicle.
Figure 2E:
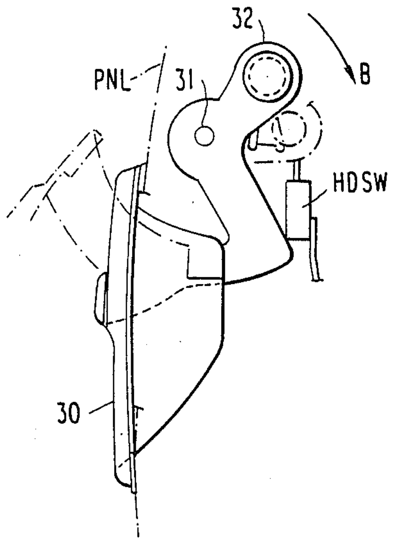
FIG. 2*b* is a fragmentary perspective view of the lock mechanism shown in FIG. 2*a;*
FIG. 2*c* is a front elevation of an external door lock mechanism mounted on the back side of the inner door lock mechanism shown in FIG. 2*a;*
FIG. 2*d* is a fragmentary plan view of the lock mechanism shown in FIG. 2*c;*

Referring to FIG. 2*e*, the external door handle 30 is mounted to a shaft 31 so as to be rotatable on the inside of the door panel PNL. A coiled spring (not shown) always urges the handle 30 to turn counterclockwise so that the handle may be pressed against the panel PNL. A link mechanism (not shown) connected to the rod 4 engages the arm 32. An external door handle switch HDSW that is normally open is rigidly fixed below the arm 32. When the handle 30 is pulled, the arm 32 rotates with the handle about the shaft 31 as schematically indicated by the phantom line in FIG. 2*e* in the direction indicated by the arrow B. Then, the arm 32 acts on the switch HDSW and closes it.

In the operation of the door lock mechanism constructed as described thus far, pulling the external door handle 30 shifts the rod 4 (FIGS. 2*a* and 2*b*) of the internal door lock mechanism to the left via the link mechanism (not shown) engaging with the arm 32. Under this unlocked condition shown in FIGS. 2*a* and 2*b*, the push arm 3*b* of the connector lever 3 bears on the claw 13*a* of the unlatch lever 13. Therefore, the shift of the rod 4 to the left rotates the lever 13 and the pin $13_1$ counterclockwise, causing the cam $13_2$ rigidly fixed to the pin $13_1$ to rotate clockwise as viewed in FIG. 2*c*. Then, the detent lever 23 is rotated clockwise against the action of the spring 24. As a result, the primary latch 20*a* of the bolt 20 is disengaged from the claw of the detent lever 23, thus permitting the bolt 20 to rotate. The bolt 20 then disengages from the striker 26, releasing the door. When the external door handle 30 is no longer pulled, the connector lever 3, the return lever 2, and the rod 4 are returned to their original state by the action of the tension spring 5.

When the internal door handle (not shown) is operated, the rod 14 is pulled away from the page as viewed in FIGS. 2*a* and 2*b* and acts on the lower end of the unlatch lever 13 via the link mechanism 15, rotating the lever 13 counterclockwise. Thus, the door is unlatched in the same way as the foregoing.

Under the unlocked condition shown in FIGS. 2*a* and 2*b*, when a door key is inserted into the door key cylinder KS and the cylinder is rotated in a forward direction, the rod 12 is moved to the right. The rod 12 then acts on the arm 7*a* of the second rocking plate 7, rotating the plate 7 clockwise. This rotaty motion of the plate is transmitted to the protrusion $6_2$ on the first rocking plate 6 via the first push arm 7*b* of the plate 7. This rotates the plate 6 clockwise until the fourth arm 6*d* of the plate 6 bears against the stopper 11. Then, the connector lever 3 is pulled downward as viewed in FIGS. 2*a* and 2*b* via the pin $6_1$ and the slot 3*a* in the lever 3. The pin $6_1$ is rigidly fixed to the first arm 6*a* of the first rocking plate 6. The push arm 3*b* of the lever 3 disengages from the claw 13*a* of the unlatch lever 13, locking the door.

The rotation of the first rocking plate 6 also moves the rods 9 and 10 in the direction indicated by the arrow A in FIG. 2*a* via the link mechanism 8 engaging with the second arm of the first rocking plate 6. The rod 9 then forces the plunger 16 into the body of the actuator DLA to cause the plunger to assume its second posture. In this state, the door lock switch DLSW mounted in the actuator DLA is closed, and the rod 10 depresses an inner rocking button (not shown).

Under this locked condition, if the external door handle 30 is operated, the produced rotary motion is not transmitted to the unlatch lever 13, because the push arm 3*b* of the connector lever 3 is not in contact with the claw 13*a* of the unlatch lever 13. Therefore, the external lock mechanism shown in FIG. 2*c* is not unlatched. When the door key is no longer rotated, a spring (not shown) restores the key cylinder KS, the rod 12, and the second rocking plate 7 into the condition shown in FIGS. 2*a* and 2*b*.

Under the unlocked condition shown in FIGS. 2*a* and 2*b*, when the actuator DLA is operated to lock the door, the plunger 16 is changed from the first posture to the second posture, pulling the rod 9 inward in the direction indicated by the arrow A. Then, the rod 9 rotates the first rocking plate 6 clockwise via the link mechanism 8 and the second arm 6*b* of the first rocking plate 6. When the inner rocking button (not shown) is depressed, the rod 10 is moved in the direction indicated by the arrow A. The rod 10 also rotates the plate 6 clockwise via the link mechanism 8 and the second arm 6*b*. In either case, the push arm 3*b* of the connector lever 3 is disengaged from the claw 13*a* of the unlatch lever 13 in the same manner as the foregoing.

When the lock mechanism locks the door, if the door key is inserted into the key cylinder KS and the cylinder is rotated in the reverse direction, then the rod 12 is shifted to the left. The rod 12 then acts on the arm 7*a* of the second rocking plate 7, rotating it counterclockwise. This rotary motion of the plate 7 is transmitted to the protrusion $6_2$ on the first rocking plate 6 via the second push arm 7*c* of the plate 7. Then, the plate 6 is rotated counterclockwise until the third arm 6*c* of the plate 6 bears against the stopper 11. As a result, the connector lever 3 is pushed upward as viewed in FIGS. 2*a* and 2*b* via the pin $6_1$ rigidly attached to the first arm 6*a* of the first rocking plate 6 and via the slot 3*a* in the lever 3. This causes the push arm 3*b* of the lever 3 to engage the claw 13*a* of the unlatch lever 13. At the same time, the rods 9 and 10 are moved in the direction opposite to the direction indicated by the arrow A by the link mechanism 8 engaging with the second arm of the first rocking plate 6. The plunger 16 is pulled from the body of the actuator DLA until the plunger takes on its first posture. In this state, the door lock switch DLSW incorporated in the actuator DLA is opened, and the inner rocking button (not shown) is allowed to protrude. Thus, the unlocked condition shown in FIGS. 2*a* and 2*c* is restored.

Under the locked condition, when the door lock actuator DLA is operated to unlock the door, the plunger 16 changes from the second posture to the first posture, pushing the rod 9 in the direction opposite to the direction indicated by the arrow A. Then, the first rocking plate 6 is rotated clockwise via the link mechanism 8 and the second arm of the plate 6. Also, when the inner rocking button (not shown) is pulled to move the rod 10 in the direction opposite to the direction indicated by the arrow A, the plate 6 is rotated clockwise via the link mechanism 8 and the second plate of the rocking plate 6. Then, the push arm 3*b* of the connector lever 3 comes into contact with the claw 13*a* of the unlatch lever 13, unlocking the door.

Under the locked condition, when the inner door handle (not shown) is operated, the produced rotary motion is transmitted to the lower end of the unlatch lever 13 via the rod 14 and the link mechanism 15, rotating the lever 13 counterclockwise. The rotation of the lever 13 is transmitted to the first rocking plate 6 via a transmitting mechanism (not shown). This rotates the plate 6 counterclockwise, bringing the push arm 3*b* of the lever 3 into engagement with the claw 13 of the lever 13 in the same manner as the foregoing. Thus, the door is unlocked. At the same time, the rotation of the unlatch lever 13 causes the external door lock mechanism to unlatch the door. This makes preparations for emergency escape. Note that in the locked condition, the inner door handle locks to prohibit its operation.

Similarly, when the door is locked by the lock mechanism, if the detent lever 23 of the external door lock mechanism shown in FIG. 2*c* is rotated clockwise as viewed in FIG. 2*c*, the cam $13_2$ rotates the unlatch lever 13 counterclockwise as viewed in FIGS. 2*a* and 2*b*. This rotation is transmitted to the first rocking plate 6 via the transmitting mechanism (not shown), resulting in counterclockwise rotation of the plate 6. This brings the push arm 3*b* of the connector lever 3 into engagement with the claw 13*a* of the unlatch lever 13, unlocking the door in the same manner as the foregoing. Accordingly, when the door is open, if the inner rocking button is operated to cause the door lock mechanism to lock the door, and if the door is then closed, the fork bolt 20 of the external door lock mechanism shown in FIG. 2*c* bears on the striker 26, rotating it. Then, the detent lever 23 is rotated clockwise as viewed in FIG. 2*c*. Therefore, when the door is closed, it is not locked by the door lock mechanism. However, if the driver closes the door while pulling the external door handle 30, then the connector lever 3 moves to unlatch the transmitting mechanism (not shown). In this state, the rotary motion of the unlatch lever 13 is not transmitted to the first rocking plate 6. Hence, the door can be closed while it is locked. This eliminates the need to use the key whenever the door is locked, and also prevents inadvertent locking of the door, which would otherwise cause the undesirable situation that the door key is left behind the inside of the automobile.

The lock mechanism installed at the side of the driver's door has been described thus far. A lock mechanism fabricated in accordance with the invention and installed at the side of the front passenger's door is similar to the above-described lock mechanism except that the door lock actuator of the door lock mechanism corresponding to the actuator DLA shown in FIG. 2*a* acts only in one direction and simply pulls a plunger corresponding to the plunger 16, and that neither the switch DLSW or the like for detecting the locked state in response to the operation of the door lock actuator nor the switch HDSW or the like interlocking with the external door handle 30 is provided.

Referring next to FIG. 3, there is shown a latch mechanism for the tailgate of a vehicle. This latch mechanism consists primarily of a latch lever 40, a detent lever 42, a striker 44, and an unlatch solenoid Sol-4. The latch lever 40 has a rotating shaft 41 pivotally mounted to the stationary trunk room of the vehicle. A spring (not shown) urges the lever 40 to rotate clockwise. The detent lever 42 has a rotating shaft 43 pivotally mounted to the stationary trunk room. Another spring (not shown) urges the lever 42 to turn counterclockwise. The unlatch solenoid Sol-4 is rigidly fixed to the trunk room, and has a plunger 45 that engages a hole 42*b* formed in the lever 42 via a wire 46. The solenoid Sol-4 can be energized by closing a tailgate switch (not shown) installed in the vehicle, in order to unlatch the tailgate.

The solid lines in FIG. 3 show the condition in which the tailgate is latched. That is, the latch lever 40 engages the striker 44. The latching portion 40*a* of the lever 40 engages the detent portion 42*a* of the lever 42 to thereby prevent the lever 40 from rotating clockwise. Under this condition, the unlatch solenoid Sol-4 is energized to pull the plunger 45 to the right. The movement of the plunger is transmitted to the detent lever 42 via the wire 46 and the hole 42*b*. The lever 42 is then rotated about the shaft 43 in the direction indicated by the arrow C. As a result, the lever 42 is brought into the position indicated by the phantom lines in FIG. 3. Then, the detent portion 42*a* of the lever 42 disengages from the latching portion 40*a* of the lever 40, allowing the lever 40 to be rotated clockwise by the spring (not shown). The striker 44 is pushed back thereby. Thus, the tailgate is unlatched.

Subsequently, if the unlatch solenoid Sol-4 is deenergized, the spring (not shown) rotates the detent lever 42 about the shaft 43 in the direction opposite to the direction indicated by the arrow C. In this state, if the tailgate is closed, the striker 44 rotates the latch lever 40 counterclockwise in the direction indicated by the arrow C, pushing back the lever 42 until the latch lever 40 and the detent lever 42 rotate past a certain position. Then, the spring-loaded lever 42 is permitted to rotate in the direction opposite to the direction indicated by the arrow C. The latching portion 40*a* of the lever 40 engages the detent portion 42*a* of the lever 42. Thus, the tailgate is again latched.

FIG. 1 is a block diagram of the control system of the present lock system. The control system includes a CPU, or microcomputer, 100 as its main component. Connected with the input and output ports of the CPU 100 are a key code receiver 300, a passenger-detecting circuit 400, a timer TM1, another timer TM2, the door lock switch DLSW, the external door handle switch HDSW, the driver's door Curtis switch $OCSW_R$, a front passenger's door Curtis switch $OCSW_L$, solenoid drivers Dr1, Dr2, Dr3, and a nonvolatile memory NVM. A regulated power supply circuit REG2 connected with the battery, indicated by Btt, of the automobile supplies a regulated voltage Vcc to various components. The memory NVM is a battery back-up memory, and can be nonvolatile memory which permits data to be written to, or read from, it, or it may be DIP switch or the like.

The operation of the control system shown in FIG. 1 is now described briefly. The key code and instruction code transmitted by the key code transmitter 200 are received by the key code receiver 300. The received key code is compared with the key code stored in the memory NVM. Only when they agree and the passengerdetecting circuit 400 indicates that no one is in the vehicle, (1) the locking solenoid Sol-2 of the door lock actuator DLA at the side of the driver's door and the locking solenoid Sol-1 of the door lock actuator at the side of the front passenger's door are energized to lock the doors, (2) the unlocking solenoid Sol-3 of the actuator DLA at the side of the driver's door is energized to unlock this door, or (3) the unlatching solenoid Sol-4 of the tailgate latch mechanism is energized to unlatch the tailgate, depending on the instruction code and the states of the switches DLSW and HDSW. When either door is incompletely closed and it is locked by the corresponding door lock mechanism, the fork bolt 20 (FIG. 2*c*) of the lock mechanism engages the striker 26 but rotates insufficiently so that the second latch 20*a* engages with the claw of the detent lever 23. Under this condition, if the door is pushed, the detent lever 23 rotates as mentioned previously, unlocking the door. Immediately after this state is detected, the locking solenoid Sol-1 or Sol-2 is energized to lock the door.

Figure 4A:
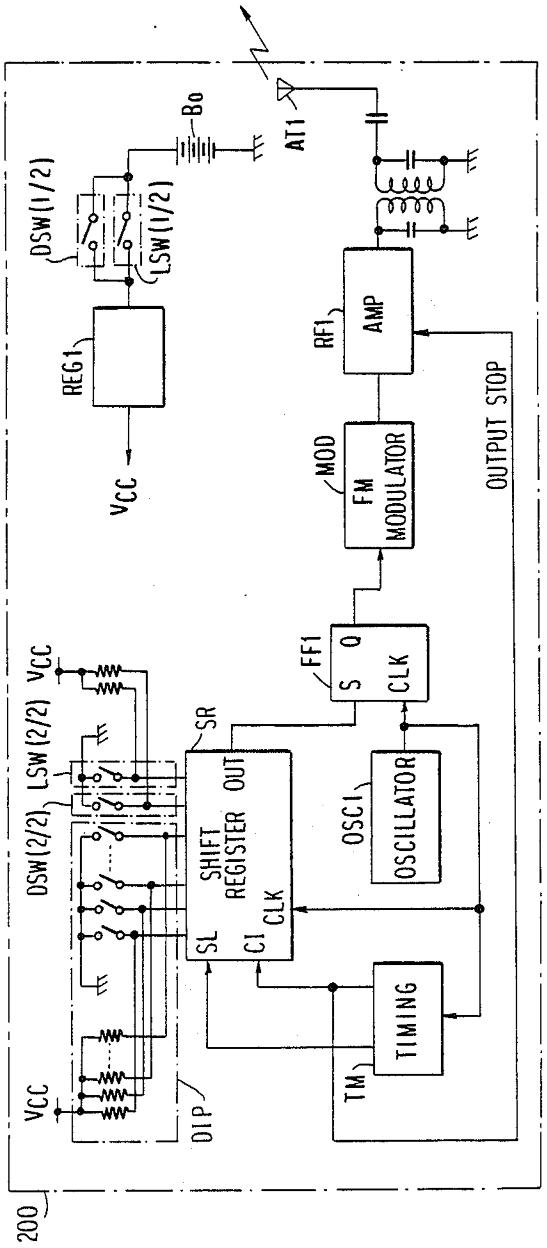

Referring to FIG. 4*a*, the key code transmitter 200 consists primarily of a DIP (dual in-line package) switch, operated key switches DSW and LSW, a parallel in serial out (PISO) shift register SR, a timing circuit TM, an oscillator OCS1, a flip-flop FF1, an FM modulator MOD, an RF amplifier RF1, a tuning circuit, an antenna AT1, and a regulated voltage-supplying circuit REG1.

Each of the key switches DSW and LSW has two contacts. The first contact DSW(½) of the switch DSW and the first contact LSW(½) of the switch LSW are inserted in parallel with a power line which connects the regulated power-supply circuit REG1 with a battery Ba.

The parallel in serial out shift register SR accepts parallel 16-bit data words and convert them into serial sequential 16-bit data streams. This register SR has 16 parallel input terminals, a clock pulse input terminal CLK, a shift load input terminal SL, a clock inhibit input terminal CI, and a serial output terminal OUT. The first bit of data is applied to the rightmost one of the 16 parallel input terminals. The second contact LSW(2/2) of the key switch LSW and a pull-up resistor are connected to the first-bit input terminal. The second contact DSW(2/2) of the key switch DSW and a pull-up resistor are connected to the second-bit input terminal. The third- through sixteenth-bit input terminals are connected with the contacts of the DIP switch and with pull-up resistors. The other ends of the switch contacts LSW(2/2), DSW(2/2), and the DIP switch are grounded. The DIP switch has 14 contacts which are opened and closed, depending on the code stored in the memory NVM. The input terminals SL and the CI of the shift register SR receive signals from the timing circuit TM. The output signal from the oscillator OCS1 is supplied to the clock input terminal CLK of the register SR, the input terminals of the timing circuit TM, and the clock input terminal CLK of the flip-flop FF1. The output terminal OUT of the register SR is tied to the input terminal S of the flip-flop FF1 whose output terminal Q is connected with the FM modulator MOD. The output terminal of the modulator MOD is connected to the RF amplifier RF1, the output of which is connected to the transmitting antenna AT1 via the tuning circuit. The amplifier RF1 has a transmission control terminal connected with the output terminal of the timing circuit TM to appropriately halt the transmission of electromagnetic waves, for reducing the electric power consumed by the key code transmitter.

Figure 4B:
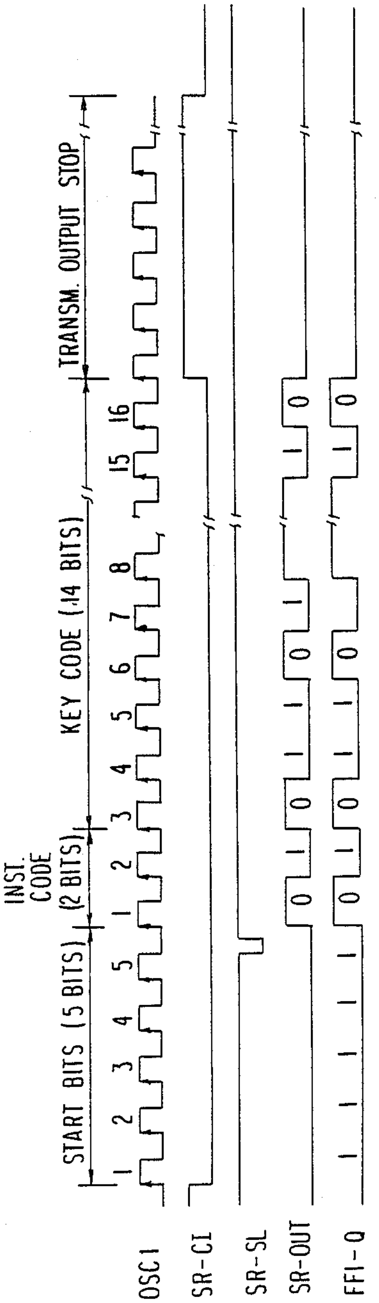

The operation of the key code transmitter 200 is now described by referring to the timing chart of FIG. 4*b*. When the driver causes the door lock mechanism to lock or unlock the door, he or she operates the key switch DSW to complete the circuit. When the driver instructs the tailgate latch mechanism to unlatch the door, he or she operates the key switch LSW to complete the circuit. These switches complete the circuit. These switches DSW and LSW constitute seesaw switches and are not closed simultaneously.

When the switch DSW is closed, a voltage is applied to the regulated voltage-supplying circuit REG from the battery Ba via the first contact DSW(½) of the switch. When the switch LSW is closed, a voltage is applied to the circuit REG from the battery Ba via the first contact LSW(½) of the switch. Then, the circuit REG supplies a regulated voltage Vcc to various components. In this way, the oscillator OCS1 and the timing circuit TM are set into operation. When the signal applied to the clock inhibit input terminal CI of the shift register SR goes low, transmission of electromagnetic waves is initiated. Concurrently, the register SR begins to shift its input data stream. At this time, the signal applied to the shift/load input terminal SL of the register is at a high level and so the key code data applied to the parallel input terminals is not read. The data appearing at the output terminal OUT of the register SR is "1". This condition continues for the time of five clocks. That is, start bits of data given by the five bits "11111" are delivered. Subsequently, a low-level signal appears at the shift/load input terminal SL for a short time. This permits the two bits of instruction code data applied to the first- and second-bit parallel input terminals of the shift register SR to be held in the register SR. The code data is "01" when the switch DSW is operated and "10" when the switch LSW is operated. Also, the 14 bits of key code data applied to the third- through sixteenth-bit input terminals of the register SR are allowed to be held in the register. These 14 bits of data vary, depending on the condition of the DIP switch.

Thereafter, the held two bits of instruction code data and 14 bits of key code data are converted into serial 16-bit data stream that appears at the output terminal OUT. After the end of this process, the start bits of data are again delivered from the register, and the second, serial 16-bit data stream is produced. These operations are repeated several times. Then, the signal applied to the clock inhibit terminal CI is caused to go high to halt the transmission of electromagnetic waves during a certain period Ts, say 0.2 second. Subsequently, these operations are repeated with the same period until either the switch DSW or LSW is opened.

On the leading edge of each incoming clock pulse, the data supplied from the shift register SR to the flip-flop FF1 appears at the output terminal Q of the flip-flop. The output signal from the flip-flop FF1 is frequency-modulated by the modulator MOD and amplified by the RF amplifier RF1. The output signal from the amplifier is fed via the tuning circuit to the antenna AT1, which radiates electromagnetic energy.

FIG. 5 schematically shows the configuration of the key code receiver 300 installed on the vehicle. The receiver 300 consists mainly of an oscillator OSC2, a local oscillator OSC3, an RF amplifier RF2, a mixer MIX, an intermediate-frequency amplifier IFA, a frequency discriminator DIS, an audio-frequency amplifier AFA, comparators CP1 and CP2. An antenna AT2 for receiving electromagnetic waves is connected with the input terminal of the amplifier RF2 via a tuning circuit.

The electromagnetic waves sent from the key code transmitter 200 (FIG. 1) are received by the antenna AT2. Then, the signal supplied to the amplifier RF2 from the tuning circuit is amplified and fed to the mixer MIX, where it is mixed with the signal generated by the local oscillator OSC3 to convert the frequency of the received signal into an intermediate frequency. The output signal from the mixer MIX is amplified by the intermediate-frequency amplifier IFA and then demodulated by the frequency discriminator DIS. The demodulated audio-frequency signal is amplified by the audio-frequency amplifier AFA and supplied to the comparators CP1 and CP2. The comparator CP1 converts its input signal into binary form. The comparator CP2 produces an enable signal corresponding to the level of the input signal. The oscillator OCS2 produces clock pulses of the same frequency as the clock pulses from the oscillator OSC1 of the key code transmitter in response to the enable signal, i.e., in synchronism with the demodulated signal.

The passenger-detecting circuit 400 is next described by referring to FIGS. *6a* and *6b*. As shown in FIG. *6a*, electrodes Sh are incorporated in a seat cushion trim cover placed on the driver's seat St. The passenger-detecting circuit 400 makes use of the fact that the electrostatic capacity produced between the electrodes and grounded roof Rf and the floor varies greatly, depending on whether a person MAN sits on the seat or not. It is said that the specific dielectric constant of the human is about 80.

Referring to FIG. *6b*, the detecting circuit 400 comprises an oscillator circuit CRO, a frequency-to-voltage converter FV for producing a voltage corresponding to the oscillation frequency of the oscillator circuit CRO, and a comparator CP3 for comparing the output voltage from the converter FV with a certain voltage. The input terminal of the oscillator circuit CRO is connected with the electrodes Sh, while the other input terminal is grounded. Thus, a capacitor is substantially connected to the oscillator circuit.

The operation of the detecting circuit 400 is now described. In the normal condition in which no one sits on the driver's seat, the comparator CP3 compares the output voltage from the frequency-to-voltage converter FV with a certain voltage Vr3, the output voltage from the converter corresponding to the oscillation frequency of the oscillator circuit CRO. At this time, the comparator CP3 produces a high-level output. When a person MAN sits on the driver's seat, the electrostatic capacity between the electrodes Sh and the grounded automotive body increases, greatly lowering the oscillation frequency of the oscillator circuit CRO. Then, the output voltage from the converter FV decreases. Therefore, the output from the comparator CP3 goes low (for further information on the passenger-detecting circuit 400, see Japanese Patent application Nos. 280300/1985 and 232371/1985).

FIGS. *7a* and *7b* are flowcharts for illustrating the main routine performed by the CPU 100 shown in FIG. 1. FIGS. *8a* and *8b* are flowcharts for illustrating the subroutines carried out by the CPU 100. The operation of the CPU 100 is now described by referring to these flowcharts. First, the signals appearing at the output ports 01–03 are caused to go low, and internal registers F1, F2, FG are cleared to initialize CPU (step 1). The instruction code of 2 bits and the key code of 14 bits received by the key code receiver 300 are read (step 2).

The routine for reading the codes are now described by referring to FIGS. *8a* and *8b*. Registers Ra, Rb, Rc, Rd, and Re are cleared (step 30). The start bits are detected at steps 31–35. The step 31 for detecting the leading edge of each clock pulse is carried out as illustrated in FIG. *8b*. First, the flag register FG is set to 0 (step 50). If the leading edge of a clock pulse is detected (step 51), then the flow returns to the step 31 shown in FIG. *8a*. If not so, a decision is made to determine whether the contents of the flag register FG are equal to 1 (step 52). If the result of the decision is YES, the timer TM2 is reset and operated for 0.1 second (step 53). If the leading edge is not detected before the timer generates a timeout signal, then the key code transmitter 200 is regarded to produce no output (step 54). Then, the flow returns to step 1 shown in FIG. *7a*.

Referring back to FIG. *8a*, the level of the demodulated signal is detected in synchronism with the leading edge of each clock pulse (step 32). If the level is low (step 33), the register Ra is incremented (step 34). If the demodulated signal goes high before five successive low states are detected (step 35), then the flow goes back to step 30, where the registers Ra–Re are cleared. Then, the operation for detecting the start bits is repeated.

Referring still to FIG. *8a*, after the start bits are detected, the instruction code of two bits is read (steps 36–41). In the same manner as the foregoing steps, the level of the demodulated signal is detected in synchronism with the leading edge of each clock pulse (step 36), and the resulting signal is read (step 37). The contents of the register Rb are shifted upward by one bit position (step 38). The read data bit which is either 1 or 0 is placed into the least significant-bit (LSB) position of the register Rb (step 39). Then, the register Rc is incremented (step 40). These cyclic operations are repeated twice until the contents of the register Rc become two.

The key code of 14 bits is read (steps 42–47). In the same way as the foregoing steps, the leading edge of each clock pulse is detected (step 42). The level of the demodulated signal is detected in synchronism with the leading edge (step 43). Then, the contents of the register Rd are shifted upward by one bit position (step 44). Thereafter, the read data bit that is either 1 or 0 is placed into the least significant-bit (LSB) position of the register Rd (step 39). The register Re is incremented (step 40). This cyclic series of steps are repeated until the contents of the register Re reach 14. The flow then returns to the main routine illustrated in FIG. *7a*. The key code of 14 bits held in the register Rd is compared with the code previously stored in the memory NVM (step 3). If they do not agree, the flow returns to step 1, because the key code transmitter 200 is maintained in operation while the switch DSW or LSW is closed. Hence, these operations are repeated.

If the read key code coincides with the code stored in the memory NVM (step 3), then the flow proceeds to step 4, where the output from the passenger-detecting circuit 400 is checked. If the signal appearing at the input port P2 is at a low level, indicating the presence of a person, then the flow returns to step 1. If the signal is at a high level, indicating the absence of a person, then the flow goes to step 5, where the instruction code held in the register Rb is checked. Accordingly, when the driver's seat is occupied by a person, the operation of the key code transmitter 200 is made ineffective.

When the switch LSW is operated, the instruction code is given by "10". The flow goes from step 5 to step 6, where the signal appearing at the output port 03 is caused to go high. This energizes the unlatching solenoid Sol-4 of the tailgate latch mechanism. After the lapse of a given period (step 12), the flow returns to step 1.

When the switch DSW is operated, the instruction code is given by "01". Then, the flow proceeds to step 7, where the condition of the door lock switch DLSW in the actuator DLA of the lock mechanism for the driver's door is detected. If the lock mechanism locks the door, the switch DSW is closed. The flow goes to step 8, where the timer TM1 is reset and operated for 15 seconds. The flow goes along the loop containing the steps 9 and 10. If the external door handle 30 at the side of the driver's door is operated to close the external door handle switch HDSW before the timer TM1 generates a timeout signal, then the signal appearing at the output port 02 is caused to go high (step 11). This energizes the unlocking solenoid Sol-3 of the actuator DLA. After the lapse of a given period (step 12), the flow returns to step 1. Accordingly, when the driver's door is locked, it cannot be opened unless the external door handle 30 is operated before the timer TM1 produces the timeout signal.

Figure 7A:
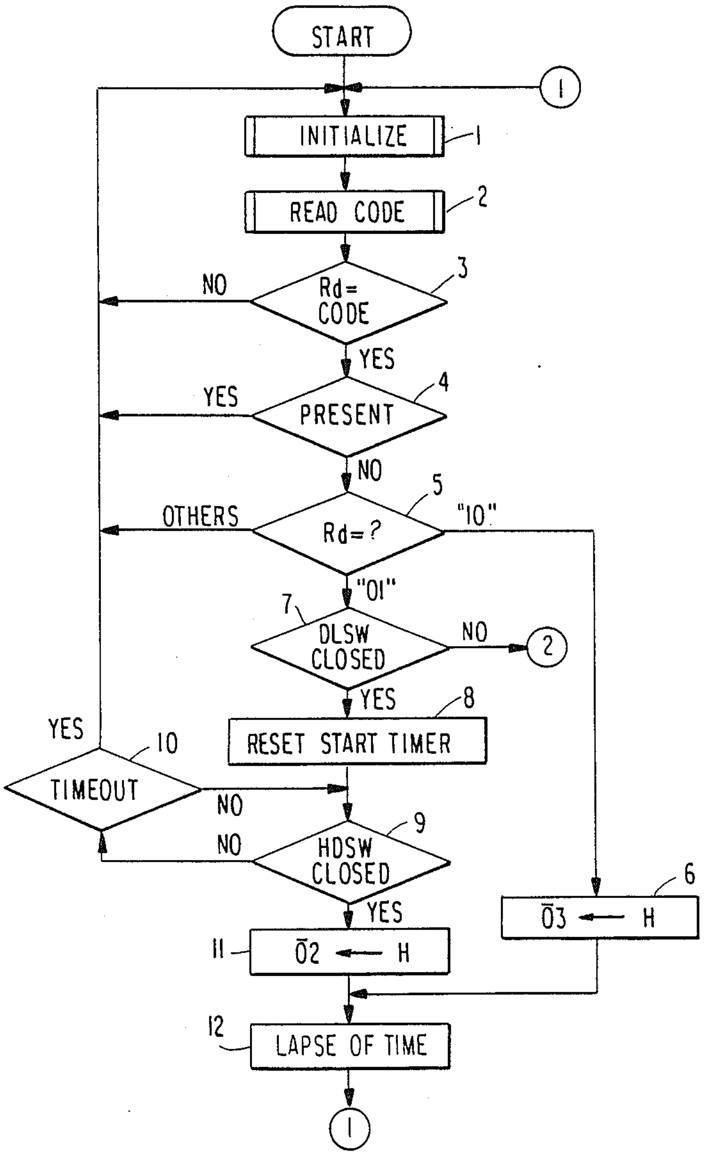
Figure 7B:
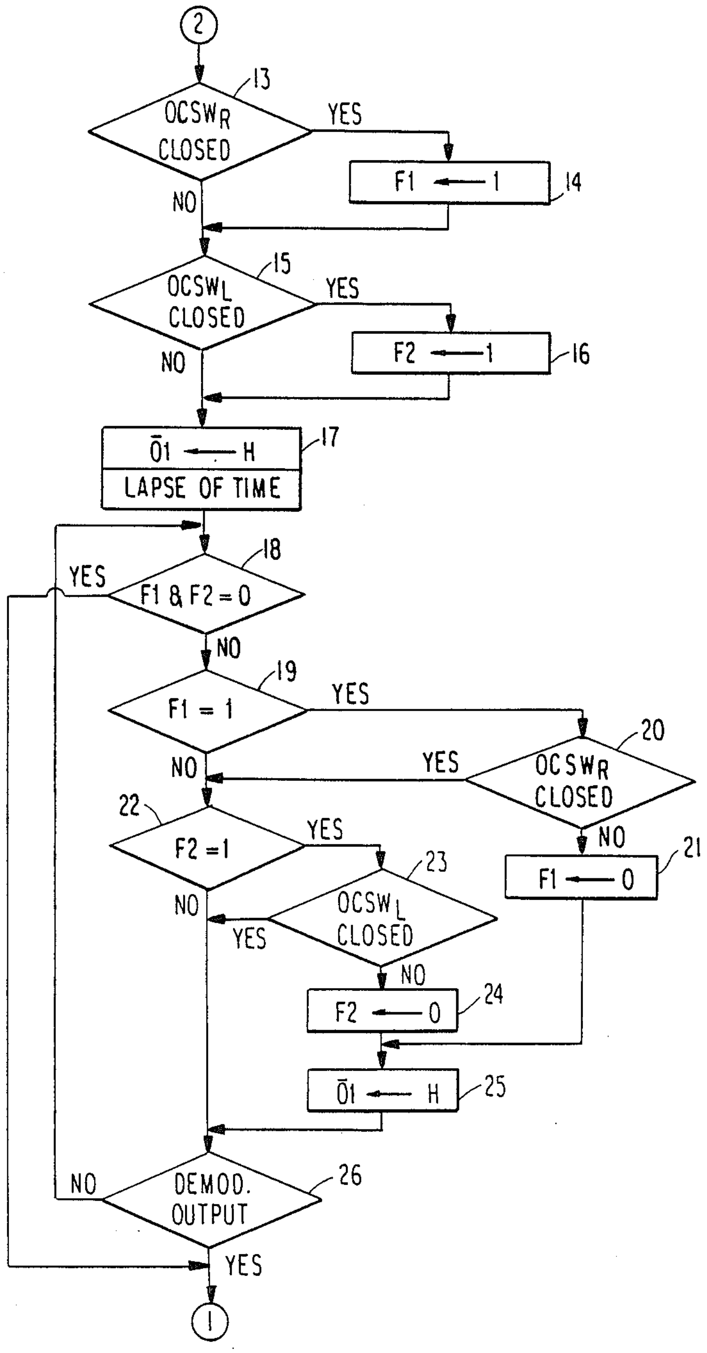
Figure 8A:
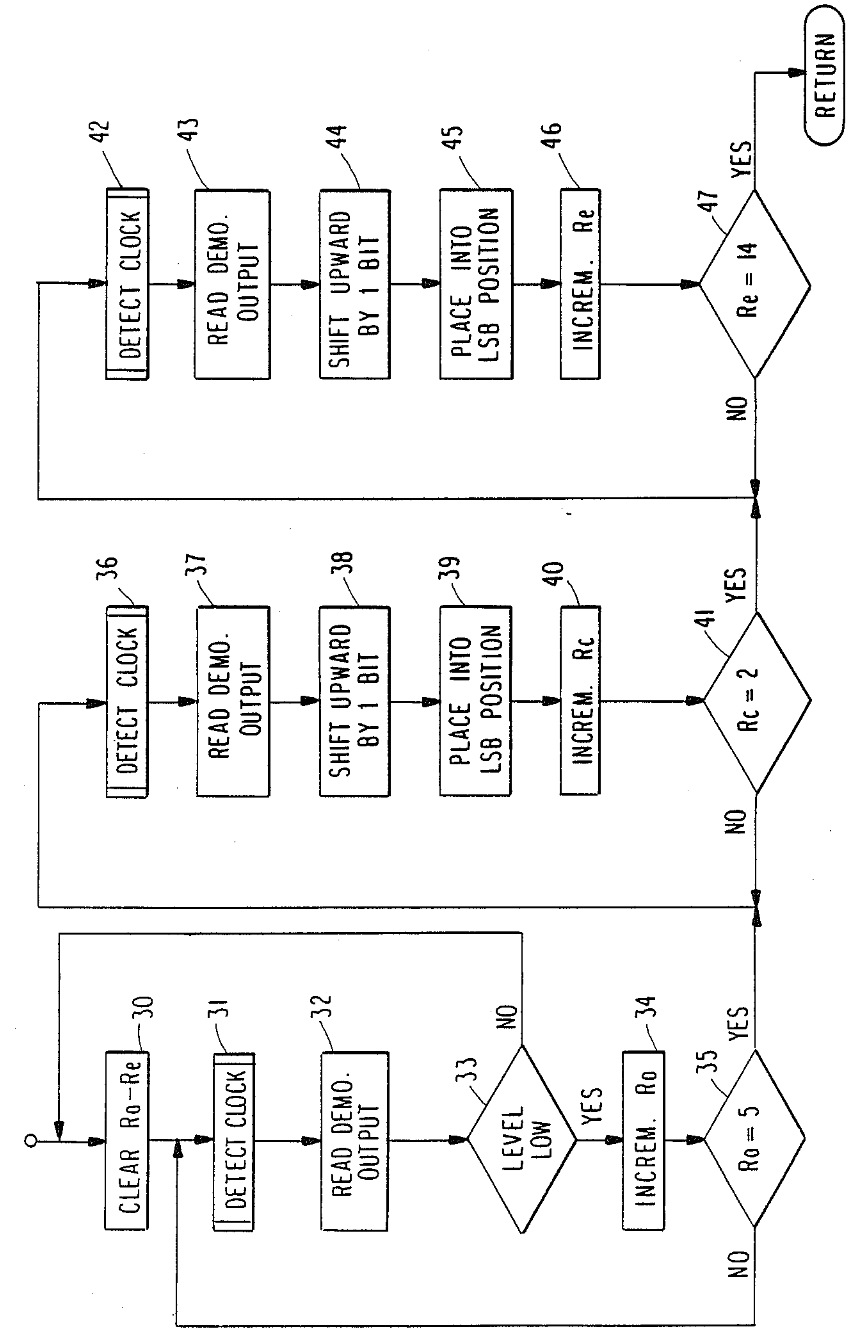
Figure 8B:
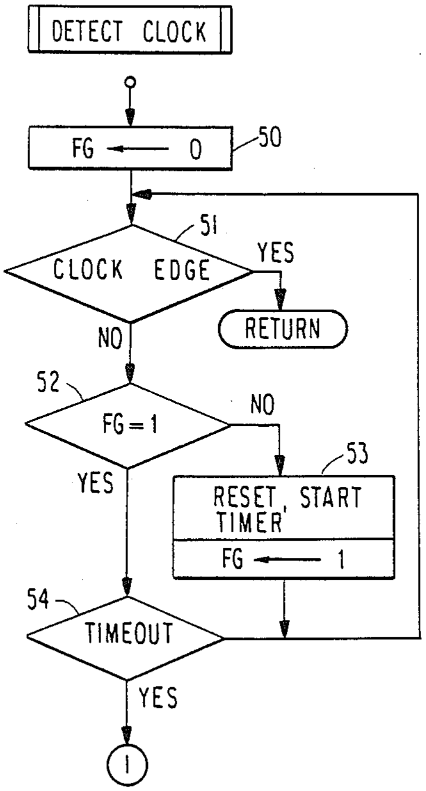

When the driver's door is unlocked by the door lock mechanism, the door lock switch DSW is open. The flow goes to step 13 shown in FIG. 7*b*. The condition of the driver's door Curtis switch $OCSW_R$ is detected (step 13). If it is open, the driver's door is incompletely closed. Then, the flag register F1 is set to 1 (step 14). The signal appearing at the output port 01 is caused to go high (step 17). This energizes the locking solenoid Sol-2 of the actuator DLA for the driver's door and the locking solenoid Sol-1 of the door lock actuator for the front passenger's door. After the lapse of a given period, the flow goes to step 18, where a check is made to see if the contents of the registers F1 and F2 are equal to 1. If so, the flow returns to step 1 (FIG. 7*a*). If at least one of them is 0, the flow proceeds to step 19. Then, the condition of the switch $OCSW_R$ and/or the condition of the switch $OCSW_L$, and the demodulated signal are monitored while the flow goes from step 19, to (step 20), step 22, (step 23), and step 26 and then returns to step 19. Therefore, when the driver's door is incompletely closed and the door lock mechanism is actuated to lock it, the register F1 is set to 1 and so the flow goes to steps 19, 20, 22, 26, 19, and so on. Under this condition, if the door is pushed, the detent lever 23 (FIG. 2*c* ) is rotated as mentioned above, so that the door lock mechanism momentarily unlocks the driver's door. However, the aforementioned push closes the door completely, and closes the Curtis switch $OCSW_R$. Therefore, the flow goes to steps 20, 21, and 25 in this order. The signal appearing at the output port 01 goes high, again causing the door lock mechanism to lock the door. The same concept applies to the lock mechanism for the front passenger's door.

In the above example, the vehicle has two front doors. Obviously, the invention also may be applied to a vehicle having four or more doors.

As can be understood from the description thus far made, even when the driver incorrectly operates the lock system to thereby produce a signal containing information on the key code, the lock mechanism does not unlock the door unless a handle for opening the door is operated within a given period. Therefore, it is unlikely that the lock mechanism keeps unlocking the door. Whenever the driver consciously performs an operation to produce such a signal, he or she operates the handle. Hence, the door is unlocked in a conventional manner. When the driver locks the door without knowing that it has been incompletely closed, if another person pushes the door, unlocking it, then the full closure of the door is immediately detected. The drive means is again energized to lock the door. Therefore, it is unlikely that another person unlocks it. When the driver notices that the door is incompletely closed after locking it, he or she consciously pushes it. Thus, the door can be locked without the need to actuate the door lock mechanism again. Consequently, the novel lock system is operated with greater ease than the conventional lock system.

What is claimed is:

1. A lock system for a cover member that covers an opening in a vehicle, comprising:
- a lock mechanism capable of locking the cover member;
- a driver means which, when energized, causes the lock mechanism to unlock the cover member;
- an electrical driver for energizing the driver means;
- a manually operated handle for opening the cover member;
- a detector means for detecting the operation of the handle;
- a key code-generating means for producing a signal containing information on a certain key code;
- a key code-detecting means which is installed on the vehicle, receives the signal containing the information on the key code, and detects the key code;
- a storage means in which a key code is stored;
- a comparator means for comparing the key code detected by the detector means with the key code stored in the storage means;
- a timer means; and
- a control means which, when the comparator means indicates the coincidence between the two key codes, starts the timer means and which actuates the driver means when the detector means detects the operation of the handle before the timer means generates a timeout signal.

2. The lock system of claim 1, wherein said cover member is a door, and wherein said handle is an external door handle.

3. The lock system of claim 1, wherein the signal produced by the key code-generating means takes the form of electromagnetic waves.

4. A lock system for a cover member that covers an opening in a vehicle, comprising:
- a lock mechanism capable of locking the cover member;
- a driver means which, when energized, causes the lock mechanism to lock the cover member;
- an electrical driver for energizing the driver means;
- an instruction means for receiving an instruction for locking the cover member;
- a detector means for detecting the full closure of the cover member; and
- a control means which, when it receives an instruction signal from the instruction means under the condition that the detector means does not detect the full closure of the cover member, energizes the electrical driver to actuate the driver means and which, when the detector means later detects the full closure, energizes the electrical driver again to actuate the driver means.

5. The lock system of claim 4, wherein said instruction means comprises:
- a key code-generating means for producing a signal containing information on a certain key code;
- a key code-detecting means which is installed on the vehicle, receives the signal from the key code-generating means, and detects the key code contained in the signal;
- a storage means in which a key code is stored; and
- a comparator means for comparing the key code detected by the key code-detecting means with the key code stored in the storage means.

6. The lock system of claim 4, wherein the signal produced by the key code-generating means takes the form of electromagnetic waves.

7. The lock system of claim 4 or 6, wherein said cover member is a door.

8. A lock system for a cover member that covers an opening in a vehicle, comprising:

a lock mechanism capable of locking the cover member;

a driver means which, when energized, actuates the lock mechanism to lock or unlock the cover member;

a key code-generating means for producing a signal containing informations on certain key codes;

a key code detecting means which is installed on the vehicle, receives the signal containing the informations of the key codes, and detects the key codes;

a storage means in which key codes are stored;

a comparator means for comparing the key codes detected by the key code-detecting means with the key codes stored in the storage means;

a detector means for detecting the full closure of the cover member;

a control means connected with the key code-detecting means and also with the driver means and acting to energize the driver means to lock the cover member according to the output signal from the key code-detecting means; and a relocking means for relocking the lock mechanism upon detection of full closure of the cover member by said detector means to lock the cover member when said detector means initially does not detect full closure of the cover member and the cover member is subsequently fully closed thereby unlocking the lock mechanism.

9. The lock system of claim 8, further including:

a manually operated handle for opening the cover member;

an operation-detecting means that produces an output signal to the relocking means when the handle is operated, wherein the relocking means relocks the lock mechanism unless the handle is operated.

10. The lock system of claim 8, wherein said lock mechanism is an electromagnetically operated actuator.

11. The lock system of claim 8, wherein said driver means includes solenoids.

12. The lock system of claim 8, wherein said key code-generating means is a transmitter for producing electromagnetic waves, and wherein said key code-detecting means is a receiver for receiving the electromagnetic waves produced by the transmitter.

13. The lock system of claim 8, wherein said storage means is a nonvolatile memory.

14. The lock system of claim 8, wherein said comparator means and said control means are incorporated in a microcomputer.

15. The lock system of claim 8, further including a manually operated handle for opening the cover member and an operation-detecting means that produces an output signal to the control means when the handle is operated.

16. The lock system of claim 15, further including a timer means capable of generating a timeout signal after a fixed period of time, and wherein the control means acts to start the timer means when the comparator means indicates the coincidence between the two key codes and to actuate the driver means when the operation-detecting means produces the output signal before the timer means generates the timeout signal.

17. The lock system of claim 8, further including a detector means which supplies a signal to the control means when the cover member is completely closed, and wherein the control means acts to energize the driver means when the comparator means indicates the coincidence between the two key codes under the condition that the detected means supplies no signal to the control means and acts to energize the driver means again when the detector means later supplies a signal to the control means.

18. The lock system of claim 8, further including a passenger-detecting circuit which detects the pressure of a person on the driver's seat by measuring the electrostatic capacity between electrodes installed on the driver's seat and the grounded vehicular body.

19. A lock system for a cover member that covers an opening in a vehicle, comprising:

a lock mechanism capable of locking the cover member;

a driver means which, when energized, actuates the lock mechanism to lock or unlock the cover member;

a key code-generating means for producing a signal containing informations on certain key codes;

a key code detecting means which is installed on the vehicle, receives the signal containing the informations of the key codes, and detects the key codes;

a storage means in which key codes are stored;

a comparator means for comparing the key codes detected by the key code-detecting means with the key codes stored in the storage means;

a control means connected with the key code-detecting means and also with the driver means and acting to energize the driver means according to the output signal from the key code-detecting means;

a relocking means for relocking the lock mechanism to lock the cover member after unlocking the lock mechanism;

a manually operated handle for opening the cover member; and an operation-detecting means that produces an output signal to the relocking means when the handle is operated, wherein the relocking means relocks the lock mechanism unless the handle is operated.

20. A lock system for a cover member that covers an opening in a vehicle, comprising:

a lock mechanism capable of locking the cover member;

a driver means which, when energized, actuates the lock mechanism to lock or unlock the cover member;

a key code-generating means for producing a signal containing informations on certain key codes;

a key code detecting means which is installed on the vehicle, receives the signal containing the informations of the key codes, and detects the key codes;

a storage means in which the key codes are stored;

a comparator means for comparing the key codes detected by the key code-detecting means with the key codes stored in the storage means;

a control means connected with the key code-detecting means and also with the driver means and acting to energize the driver means according to the output signal from the key code-detecting means;

a relocking means for relocking the lock mechanism to lock the cover member after unlocking the lock mechanism;

a manually operated handle for opening the cover member;

an operation-detecting means that produces an output signal to the relocking means when the handle is operated, wherein the relocking means relocks the lock mechanism unless the handle is operated;

a detector means which supplies a signal to relocking means when the cover member is completely closed; and a discriminating means for discriminating the signal to lock the locking mechanism from the key code detecting means in advance of signal from the detector means;

wherein the relocking means relocks the lock mechanism if the discriminating means discriminates that the locking mechanism is locked before the cover member is completely closed.

21. A lock system for a cover member that covers an opening in a vehicle, comprising:

a lock mechanism capable of locking the cover member;

a driver means which, when energized, actuates the lock mechanism to lock or unlock the cover member;

a key code-generating means for producing a signal containing informations on certain key codes;

a key code detecting means which is installed on the vehicle, receives the signal containing the informations of the key codes, and detects the key codes;

a storage means in which the key codes are stored;

a comparator means for comparing the key codes detected by the key code-detecting means with the key codes stored in the storage means;

a control means connected with the key code-detecting means and also with the driver means and acting to energize the driver means according to the output signal from the key code-detecting means;

a relocking means for relocking the lock mechanism to lock the cover member after unlocking the lock mechanism;

a manually operated handle for opening the cover member, an operation-detecting means that produces an output signal to the control means when the handle is operated; and a timer means capable of generating a timeout signal after a fixed period of time, wherein the control means acts to start the timer means when the comparator means indicates the coincidence between the two key codes and to actuate the driver means when the operation-detecting means produces the output signal before the timer means generates the timeout signal.

22. A lock system for a cover member that covers an opening in a vehicle, comprising:

a lock mechanism capable of locking the cover member;

a driver means which, when energized, actuates the lock mechanism to lock or unlock the cover member;

a key code-generating means for producing a signal containing informations on certain key codes;

a key code detecting means which is installed on the vehicle, receives the signal containing the informations of the key codes, and detects the key codes;

a storage means in which key codes are stored;

a comparator means for comparing the key codes detected by the key code-detecting means with the key codes stored in the storage means;

a control means connected with the key code-detecting means and also with the driver means and acting to energize the driver means according to the output signal from the key code-detecting means;

a relocking means for relocking the lock mechanism to lock the cover member after unlocking the lock mechanism; and a detector means which supplies a signal to the control means when the cover member is completely closed, wherein the control means acts to energize the driver means when the comparator means indicates the coincidence between the two key codes under the condition that the detected means supplies no signal to the control means and acts to energize the driver means again when the detector means later supplies a signal to the control means.

* * * * *